JAMES C. HERVEY, OF CINCINNATI, OHIO.

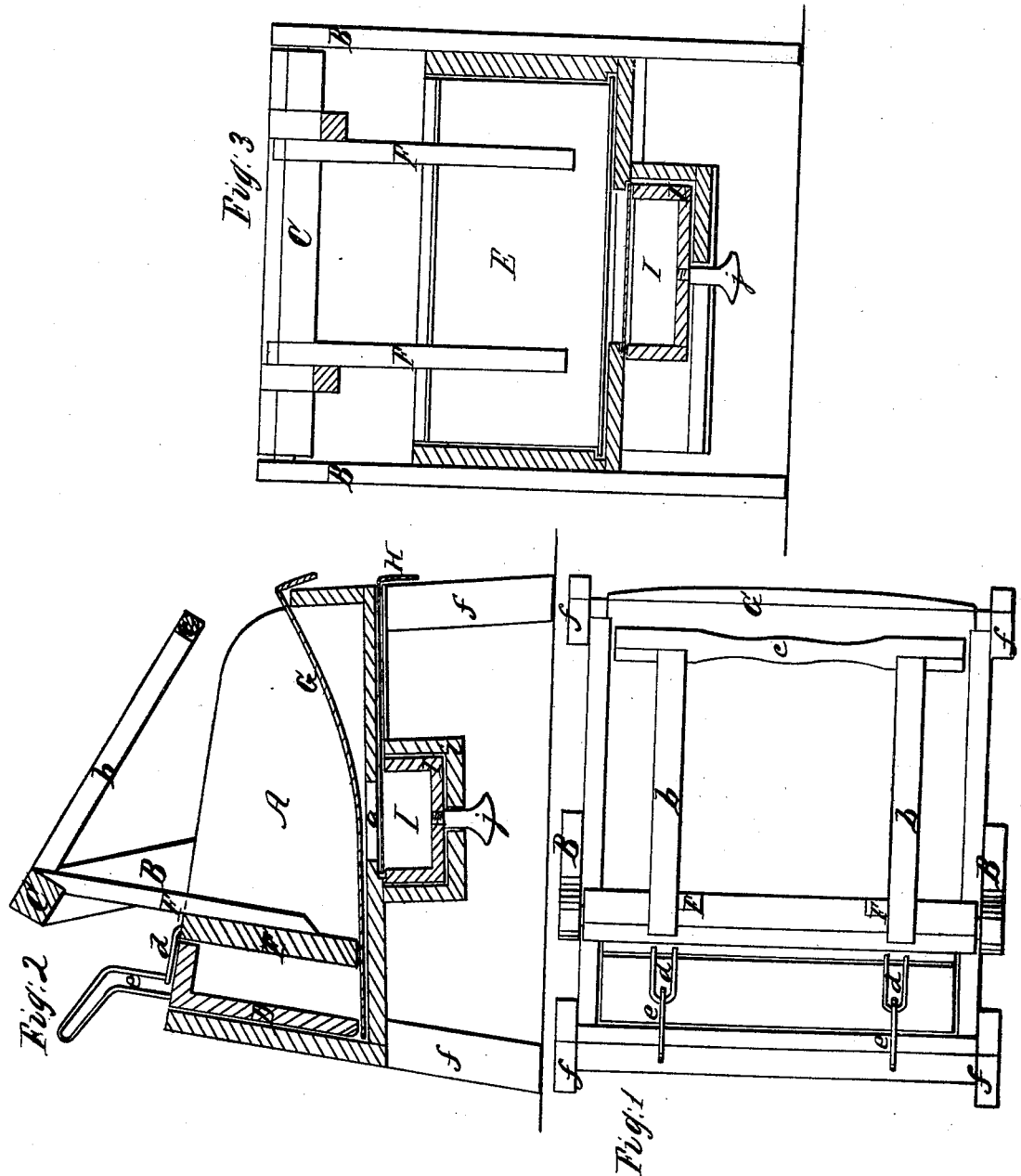

Letters Patent No. 89,480, dated April 27, 1869.

IMPROVEMENT IN MACHINE FOR MOULDING AND WORKING BUTTER.

The Schedule referred to in these Letters Patent and making part of the same.

*To all whom it may concern:*

Be it known that I, JAMES C. HERVEY, of Cincinnati, in the county of Hamilton, and State of Ohio, have invented a new and valuable Improvement in Working and Moulding Butter; and I do hereby declare that the following is a full, clear, and exact description of the construction and operation of the same, reference being had to the annexed drawings, making a part of this specification, and to the letters and figures of reference marked thereon.

Figure 1, of the drawings, is a plan view of my device;

Figure 2 is a longitudinal section; and

Figure 3 is a vertical section thereof.

My improvement refers to butter-working and moulding-machines.

Letter A represents a box, resting on four legs, $b$, $b$, $b$, $b$, open at the top, its sides bevelled from rear to front, as seen by reference to drawings.

The bottom of the box has an oblong aperture in its centre $a$. (See fig. 2.)

B B B, (see figs. 1 and 2,) represent two nearly upright posts, screwed to the sides of box A, as shown in drawings.

Letter C represents a horizontal axle, journalled into the upper end of upright posts B.

On the upper surface of axle C, two shafts, $b$ $b$, are mortised, extending forward to a point on a line with the front of box A. On the front end of shafts $b$ $b$ is mortised a cross-bar, $c$.

D and E represent compressing-boards, working transversely inside the box A, being joined together on their upper edge by staples $d$ $d$ and $e$ $e$, linked to each other, and operating as sliding hinged joints.

F F represent two arms, extending from axle C to front compressing-board E, as represented in figs. 1 and 2.

G is a metallic slide, concave, and when in place, forming a false bottom to box A.

H, fig. 2, is another metallic slide, passing under the bottom and oblong opening, $a$.

I represents a moulding-box, (on whose inner sides and bottom are engraved appropriate designs, to stamp the butter when pressed into the moulding-box,) placed under the oblong opening in bottom of box A, encased in an outer box, $i$, open at one end, and a slot on the under surface, to enable the moulding-box to be withdrawn by knob $j$.

An aperture is constructed in the rear of box A, for the escape of buttermilk.

My butter-working and moulding-machine is operated as follows:

The butter to be worked and moulded is placed upon the zinc false bottom, in front of the compressing-board D.

The operator then alternately raises and depresses the levers $b$ $b$, in connection with arms F, attached to the compressing-board E by means of the cross-bar $c$, thus compressing the mass between the two compressing-boards D and E. The buttermilk passes out of a small aperture in the rear of box A.

After being sufficiently worked, the false bottom G and zinc slide H are withdrawn.

Then the operator, by the same process of working the lever, presses the butter through the aperture $a$ in the bottom of the box A, into the moulding-box I, which there receives the impression of the various designs which may be used.

Then the slide H is introduced, separating the mass in the moulding-box from the mass above.

The moulding-box is then withdrawn by the knob $j$, and contents removed. This process is again repeated until the whole mass is thus moulded.

What I claim as my invention, and desire to secure by Letters Patent, is—

A butter-worker and moulder, having box A, aperture $a$, axle C, shafts $b$, cross-bar $c$, compressing-boards D and E, staples $d$ and $e$, slides G and H, and moulding-box I, constructed, arranged, and operating substantially as specified.

In testimony that I claim the above, I have hereunto subscribed my name, in the presence of two witnesses.

JAMES C. HERVEY.

Witnesses:
D. S. VANPELT,
PETER J. MAGLY.